(12) United States Patent
Guan et al.

(10) Patent No.: US 11,553,998 B2
(45) Date of Patent: Jan. 17, 2023

(54) WATER TOOTHPICK

(71) Applicant: SHENZHEN YUNDING INFORMATION TECHNOLOGY CO., LTD., Guangdong (CN)

(72) Inventors: Enping Guan, Guangdong (CN); Liancheng Chen, Guangdong (CN)

(73) Assignee: SHENZHEN YUNDING INFORMATION TECHNOLOGY CO., LTD., Shenzhen (CN)

(*) Notice: Subject to any disclaimer, the term of this patent is extended or adjusted under 35 U.S.C. 154(b) by 249 days.

(21) Appl. No.: 16/798,656

(22) Filed: Feb. 24, 2020

(65) Prior Publication Data

US 2021/0169620 A1     Jun. 10, 2021

(30) Foreign Application Priority Data

Dec. 9, 2019 (CN) .............................. 201911247882

(51) Int. Cl.
*A61C 17/02* (2006.01)
*A61H 13/00* (2006.01)

(52) U.S. Cl.
CPC .......... *A61C 17/0217* (2013.01); *A61C 17/02* (2013.01); *A61C 17/0202* (2013.01); *A61H 13/005* (2013.01)

(58) Field of Classification Search
CPC ..... A61C 17/00; A61C 17/02; A61C 17/0202; A61C 17/0217; A61C 17/022;

(Continued)

(56) References Cited

U.S. PATENT DOCUMENTS 2,467,413 A * 4/1949 Wildhack ................ F04B 9/127
                                                         62/50.3
5,655,906 A * 8/1997 Coss ...................... A61C 17/20
                                                         433/119

(Continued)

FOREIGN PATENT DOCUMENTS

CN     109381272        2/2019
CN     208693501        4/2019

(Continued)

OTHER PUBLICATIONS

European Search Report filed in EP 20 15 8432 dated Nov. 13, 2020.

*Primary Examiner* — Timothy A Stanis
*Assistant Examiner* — Matthew R Moon
(74) *Attorney, Agent, or Firm* — Rankin, Hill & Clark LLP

(57) ABSTRACT

The invention discloses a water toothpick, which includes a high-pressure gas generator, a water tank, a valve, a nozzle assembly and a water supply, wherein the high-pressure gas generator is communicated with the nozzle assembly, the valve is arranged between the high-pressure gas generator and the nozzle assembly, and the water supply is respectively communicated with the water tank and the nozzle assembly, so as to convey water in the water tank to the nozzle assembly. When the water toothpick is used, the high-pressure gas generator transmits generated high-pressure gas to the valve, and after a certain amount of water is stored in the nozzle assembly, the valve is opened, and the high-pressure gas at the valve is instantaneously discharged into the nozzle assembly, mixed with the water in the nozzle assembly to form compressed vapor, and then sprayed out from the nozzle assembly to complete one cleaning action.

10 Claims, 3 Drawing Sheets

(58) Field of Classification Search
CPC ... A61C 1/0061; A61C 1/0084; A61C 1/0092; A61C 17/028; A61C 17/0211; A61C 17/024; A61H 13/005; F04B 9/127; B05B 9/0413; B05B 7/00
USPC .................................................. 239/355, 363
See application file for complete search history.

(56) References Cited

U.S. PATENT DOCUMENTS

| | | |
|---|---|---|
| 2006/0078844 A1 | 4/2006 | Goldman |
| 2007/0193797 A1* | 8/2007 | Shamis .................... F04B 9/127 180/165 |
| 2010/0273126 A1* | 10/2010 | Janssen .............. A61C 17/0202 433/89 |
| 2012/0077144 A1 | 3/2012 | Fougere |
| 2016/0331113 A1 | 11/2016 | Follows |
| 2018/0125624 A1* | 5/2018 | Tweedie ................. A61C 17/36 |

FOREIGN PATENT DOCUMENTS

| | | | |
|---|---|---|---|
| CN | 208693501 U | * | 4/2019 |
| EP | 1 833 410 | | 9/2010 |
| EP | 2 346 436 | | 6/2013 |
| EP | 2 358 294 | | 7/2016 |

\* cited by examiner

WATER TOOTHPICK

TECHNICAL FIELD

The present invention relates to the technical field of oral care appliances, and more particularly, to a water toothpick.

BACKGROUND

As an auxiliary and supplementary appliance, a water toothpick can clean places difficult to be cleaned by the toothbrush, such as a crevice between teeth and a gingival sulcus. A working principle of most existing water toothpicks is to pressurize water through a pressure pump, and then spray the pressurized water along a nozzle to a part to be cleaned in an oral cavity, so as to wash teeth.

All the water toothpicks above use a simple water flow only, but the water flow has a limited cleaning effect, and the same part usually needs to be washed for several times to clean. Moreover, a general water toothpick has a small volume, so that a water tank used for storing water has a small volume, which is easy to cause a situation that a part to be cleaned is not completely cleaned after the stored water is used up, resulting in poor user experience.

SUMMARY

The technical problem to be solved by the present invention is to provide a water toothpick, which can improve a cleaning effect and save water at the same time.

In order to solve the technical problem above, the present invention employs the technical solutions as follows.

A water toothpick includes a high-pressure gas generator, a valve, a water supply, a water tank and a nozzle assembly, wherein the high-pressure gas generator is communicated with the nozzle assembly, the valve is arranged between the high-pressure gas generator and the nozzle assembly, and the water supply is respectively communicated with the water tank and the nozzle assembly, so as to convey water in the water tank to the nozzle assembly.

Further, the water supply includes a box assembly, a separator, a rebounding element, a first one-way valve and a second one-way valve, the box assembly is provided with an accommodating cavity, and the separator is movably arranged in the accommodating cavity to divide the accommodating cavity into a first accommodating cavity and a second accommodating cavity; the first accommodating cavity is respectively communicated with the high-pressure gas generator and the nozzle assembly, and the valve is arranged between the first accommodating cavity and the nozzle assembly; the second accommodating cavity is respectively communicated with the water tank and the nozzle assembly, the first one-way valve is arranged between the nozzle assembly and the second accommodating cavity, a blocking direction of the first one-way valve is a direction flowing from the nozzle assembly to the second accommodating cavity, the second one-way valve is arranged between the water tank and the second accommodating cavity, and a blocking direction of the second one-way valve is a direction flowing from the second accommodating cavity to the water tank; and two ends of the rebounding element are connected to the separator and the box assembly.

Further, the water supply includes a box assembly, a separator, a rebounding element, a first one-way valve and a second one-way valve, the box assembly includes a first tank and a second tank, the separator includes a first separator and a second separator, the first separator is movably arranged in the first tank, the first separator and the first tank are enclosed to form a first accommodating cavity, the second separator is movably arranged in the second tank, the second separator and the second tank are enclosed to form a second accommodating cavity, and the first separator is connected with the second separator; the first accommodating cavity is respectively communicated with the high-pressure gas generator and the nozzle assembly, and the valve is arranged between the first accommodating cavity and the nozzle assembly; the second accommodating cavity is respectively communicated with the water tank and the nozzle assembly, the first one-way valve is arranged between the nozzle assembly and the second accommodating cavity, a blocking direction of the first one-way valve is a direction flowing from the nozzle assembly to the second accommodating cavity, the second one-way valve is arranged between the water tank and the second accommodating cavity, and a blocking direction of the second one-way valve is a direction flowing from the second accommodating cavity to the water tank; and two ends of the rebounding element are connected to the separator and the box assembly.

Further, the water supply includes a water pump, and the water pump is respectively communicated with the water tank and the nozzle assembly.

Further, the water toothpick includes a circuit board and a power supply, wherein the circuit board is provided with a control circuit, the circuit board is electrically connected with the power supply, and the high-pressure gas generator is electrically connected with the circuit board.

Further, the valve is electrically connected with the circuit board.

Further, the water toothpick further includes a gas pressure sensor, wherein the gas pressure sensor is communicated with the high-pressure gas generator, and is electrically connected with the circuit board.

Further, the valve is a regulating valve, a ball valve, a butterfly valve or a gate valve.

Further, a third one-way valve is arranged between the valve and the nozzle assembly, and a blocking direction of the third one-way valve is a direction flowing from the nozzle assembly to the valve.

Further, the nozzle assembly includes a water channel to be washed and a nozzle, the nozzle is communicated with the water channel to be washed, and the water channel to be washed is respectively communicated with the high-pressure gas generator and the water supply.

Further, a fourth one-way valve is arranged between the water channel to be washed and the nozzle, and a blocking direction of the fourth one-way valve is a direction flowing from the nozzle to the water channel to be washed.

Further, the water toothpick further includes a shell, wherein the shell is provided with a first end portion and a second end portion which are oppositely arranged, the high-pressure gas generator, the water supply and the valve are all located in the shell, the nozzle assembly is arranged close to the first end portion, and the water tank is connected with the second end portion.

Implementation of the embodiments of the present invention will have the following beneficial effects.

When the water toothpick is used, the high-pressure gas generator transmits generated high-pressure gas to the valve, the water supply transmits the water in the water tank to the nozzle assembly, and after a certain amount of water is stored in the nozzle assembly, the valve is opened, and the high-pressure gas at the valve is instantaneously discharged into the nozzle assembly, mixed with the water in the nozzle assembly to form compressed vapor, and then sprayed out from the nozzle assembly to complete one cleaning action.

According to the water toothpick of the present invention, the water and gas can be mixed to form high-pressure vapor. In comparison to the cleaning mode of pure high-pressure water flow, the cleaning mode of high-pressure vapor has a better cleaning effect and the water can be saved at the same time.

BRIEF DESCRIPTION OF THE DRAWINGS

In order to illustrate the technical solutions in the embodiments of the present invention or the prior art more clearly, the drawings to be used in the embodiments or the description of the prior art will be briefly introduced below. Apparently, the drawings in the following description are merely some embodiments of the present invention, and those of ordinary skills in the art can further obtain other drawings according to these drawings without going through any creative work.

Wherein.

REFERENCE NUMERALS

Figure 1:
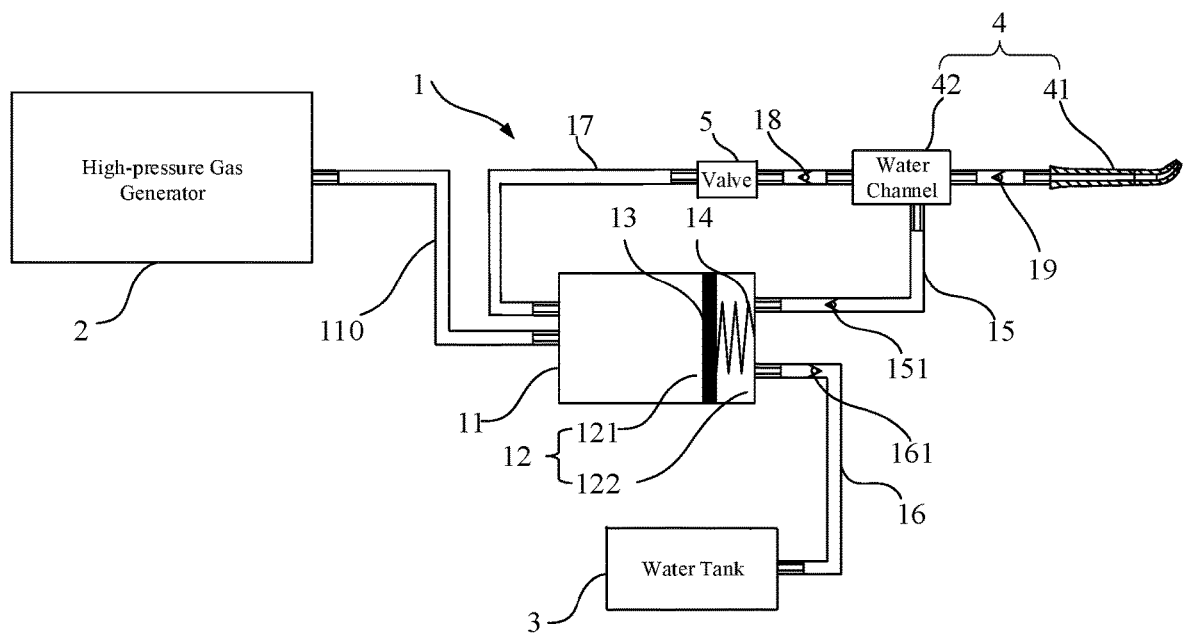
FIG. 1 is a schematic diagram illustrating a principle structure of a water toothpick according to a first embodiment.

1 refers to water supply; 11 refers to box assembly; 111 refers to first tank; 112 refers to second tank; 12 refers to accommodating cavity; 121 refers to first accommodating cavity; 122 refers to second accommodating cavity; 13 refers to separator; 131 refers to first separator; 132 refers to second separator; 14 refers to rebounding element; 15 refers to first connecting pipe; 151 refers to first one-way valve; 16 refers to second connecting pipe; 161 refers to second one-way valve; 17 refers to third connecting pipe; 18 refers to third one-way valve; 19 refers to fourth one-way valve; 110 refers to fourth connecting pipe;

2 refers to high-pressure gas generator; 3 refers to water tank; 4 refers to nozzle assembly; 41 refers to nozzle; 42 refers to water channel to be washed;

5 refers to valve; 6 refers to power supply; 7 refers to circuit board; 8 refers to shell; 81 refers to first end portion; and 82 refers to second end portion.

DETAILED DESCRIPTION

The following clearly and completely describes the technical solutions in the embodiments of the present invention with reference to the drawings in the embodiments of the present invention. Apparently, the described embodiments are merely some but not all of the embodiments of the present invention. Based on the embodiments of the present invention, all other embodiments obtained by those of ordinary skills in the art without going through any creative work shall fall within the scope of protection of the present invention.

It should be noted that all directional indications (such as upper, lower, left, right, front, rear, etc.) in the embodiments of the present invention are merely used to explain the relative positional relationship, movement condition, etc., among various components under a certain specific posture (as shown in the drawings). If the specific posture is changed, the directional indications are also changed accordingly.

Moreover, the descriptions related to "first", "second", etc., in the present invention are used for descriptive purposes only and cannot be understood as indicating or implying relative importance, or implicitly indicating the number of technical features indicated thereby. Thus, features defined by "first" and "second" may explicitly or implicitly include one or more of the features. In addition, the technical solutions in the embodiments can be combined with each other, which shall be on the basis that the technical solutions can be realized by those of ordinary skills in the art. When the combination of the technical solutions is contradictory or cannot be realized, it should be considered that the combination of the technical solutions does not exist and does not fall within the scope of protection of the present invention.

With reference to FIG. 1, the present invention provides a water toothpick, which is applied to the field of oral care. The water toothpick includes a water supply 1, a high-pressure gas generator 2, a water tank 3, a nozzle assembly 4 and a valve 5, wherein the water supply 1 is respectively communicated with the water tank 3 and the nozzle assembly 4, and is used for conveying water in the water tank 3 to the nozzle assembly 4. The high-pressure gas generator 2 is communicated with the nozzle assembly 4, and is used for transmitting compressed gas to the nozzle assembly 4. The valve 5 is arranged between the high-pressure gas generator 2 and the nozzle assembly 4, and is used for controlling whether the compressed gas enters the nozzle assembly 4.

When the water toothpick is used, the high-pressure gas generator 2 transmits generated high-pressure gas to the valve 5, the water supply 1 transmits the water in the water tank 3 to the nozzle assembly 4, and after a certain amount of water is stored in the nozzle assembly 4, the valve 5 is opened, and the compressed gas at the valve 5 is instantaneously discharged into the nozzle assembly 4, mixed with the water in the nozzle assembly 4 to form high-pressure vapor, and then sprayed out from the nozzle assembly 4 to clean an oral cavity of a user.

As shown in FIG. 1, in a first embodiment, the water supply 1 includes a box assembly 11, a separator 13, a rebounding element 14, a first one-way valve 151 and a second one-way valve 161, the box assembly 11 is provided with an accommodating cavity 12, and the separator 13 is movably arranged in the accommodating cavity 12 to divide the accommodating cavity 12 into a first accommodating cavity 121 and a second accommodating cavity 122. The first accommodating cavity 121 is respectively communicated with the high-pressure gas generator 2 and the nozzle assembly 4, and the valve 5 is arranged between the first accommodating cavity 121 and the nozzle assembly 4. The second accommodating cavity 122 is respectively communicated with the water tank 3 and the nozzle assembly 4, the first one-way valve 151 is arranged between the second accommodating cavity 122 and the nozzle assembly 4, and a blocking direction of the first one-way valve 151 is a direction flowing from the nozzle assembly 4 to the second accommodating cavity 122. The second one-way valve 161 is arranged between the water tank 3 and the second accommodating cavity 122, and a blocking direction of the second one-way valve 161 is a direction flowing from the second accommodating cavity 122 to the water tank 3. Two ends of the rebounding element 14 are connected to the separator 13 and the box assembly 11 for convenience to provide a restoring force to the separator 13.

In the embodiment, when the water toothpick is used, the high-pressure gas generator 2 firstly pumps gas into the first accommodating cavity 121, and a gas pressure in the first accommodating cavity 121 is increased gradually, thus driving the separator 13 to move in the accommodating cavity 12, gradually increasing a volume of the first accommodating cavity 121, and gradually decreasing a volume of the second accommodating cavity 122, so that water in the second accommodating cavity 122 is introduced into the nozzle assembly 4 through the first one-way valve 151. After a certain amount of water is stored in the nozzle assembly 4, the valve 5 is opened, and the compressed gas in the first accommodating cavity 121 is instantaneously discharged into the nozzle assembly 4, mixed with the water in the nozzle assembly 4 to form high-pressure vapor, and then sprayed out from the nozzle assembly 4 to complete one cleaning action. When the gas in the first accommodating cavity 121 is discharged, a pressure in the first accommodating cavity 121 can be decreased, the separator 13 is gradually reset under an action of the rebounding element 14, a negative pressure is formed in the second accommodating cavity 122, and the water in the water tank 3 can flow into the second accommodating cavity 122 through the second one-way valve 161 for the next cleaning action. In addition, in the embodiment, only one gas pump is used in the water toothpick to realize a principle of a water pump, and a structure of the water pump is omitted, so that a space occupied by the water toothpick is not increased while the cleaning effect of the water toothpick is improved.

In the embodiment, the box assembly 11 has an integrated structure. It can be understood that the box assembly 11 may also be composed of two tanks communicated with each other, and the separator 13 is movably arranged in one of the tanks.

The water supply 1 further includes a first connecting pipe 15, and the first connecting pipe 15 is used for communicating the second accommodating cavity 122 with the nozzle assembly 4. The first one-way valve 151 is arranged on the first connecting pipe 15, and is used for ensuring that water can only flow from the second accommodating cavity 122 to the nozzle assembly 4, thus preventing the water in the nozzle assembly 4 from flowing back to the second accommodating cavity 122, and ensuring a water-gas mixing effect of the water toothpick.

The water supply 1 further includes a second connecting pipe 16, and the second connecting pipe 16 is used for communicating the second accommodating cavity 122 with the water tank 3. The second one-way valve 161 is arranged on the second connecting pipe 16, and is used for ensuring that water can only flow from the water tank 3 into the second accommodating cavity 122, thus preventing the water in the second accommodating cavity 122 from flowing back to the water tank 3.

When the high-pressure gas generator 2 fills gas into the first accommodating cavity 121, the pressure in the first accommodating cavity 121 is increased, resulting in movement of the separator 13 towards a direction of decreasing the volume of the second accommodating cavity 122, thus increasing the pressure in the second accommodating cavity 122. At this time, the pressure in the second accommodating cavity 122 is higher than that in the nozzle assembly 4 and the water tank 3, the first one-way valve 151 is opened, the second one-way valve 161 is closed, and the water in the second accommodating cavity 122 is discharged into the nozzle assembly 4.

When the valve 5 is opened, the pressure in the first accommodating cavity 121 is decreased, and the separator 13 moves towards a direction of increasing the volume of the second accommodating cavity 122 under the action of the rebounding element 14. At this time, the negative pressure is formed in the second accommodating cavity 122, so that the second one-way valve 161 is opened, the first one-way valve 151 is closed, and the water in the water tank 3 enters the second accommodating cavity 122. That is to say, the principle of the water pump is realized by the high-pressure gas generator 2.

In the embodiment, the water supply 1 further includes a fourth connecting pipe 110. The fourth connecting pipe 110 is used for communicating the high-pressure gas generator 2 with the first accommodating cavity 121, and is used for conveying compressed air in the high-pressure gas generator 2 to the first accommodating cavity 121.

The water supply 1 further includes a third connecting pipe 17, the third connecting pipe 17 communicates the first accommodating cavity 121 with the valve 5, and the valve 5 is communicated with the nozzle assembly 4. In a process that the high-pressure gas generator 2 conveys the compressed air to the first accommodating cavity 121, the compressed air can also enter the third connecting pipe 17, so that a pressure in the third connecting pipe 17 is the same as that in the first accommodating cavity 121. Since the valve 5 is communicated with the nozzle assembly 4, when the valve 5 is opened, the compressed gas in the first accommodating cavity 121 and the third connecting pipe 17 can instantaneously rush into the nozzle assembly 4 to be mixed with the water in the nozzle assembly 4 and then sprayed from the nozzle assembly 4 at a high speed, so as to realize a better impact effect.

In the embodiment, the rebounding element 14 may be a spring, and is arranged in the second accommodating cavity 122, and when the gas pressure in the first accommodating cavity 121 is increased, which makes the separator 13 move, the separator 13 moves towards the direction of decreasing the volume of the second accommodating cavity 122, and the rebounding element 14 is compressed at this time. When the gas in the first accommodating cavity 121 is discharged, the rebounding element 14 is used for providing the restoring force to the separator 13, so that the separator 13 is reset quickly. It can be understood that the rebounding element can also be arranged in the first accommodating cavity 121, and the rebounding element 14 is stretched when the separator 13 moves in the direction of decreasing the volume of the second accommodating cavity 122.

In the embodiment, the separator 13 is a membrane, and is made of rubber, silica gel or thermoplastic elastomer, so as to ensure isolation between the first accommodating cavity 121 and the second accommodating cavity 122, so that the compressed air in the first accommodating cavity 121 cannot enter the second accommodating cavity 122, and the water in the second accommodating cavity 122 cannot enter the first accommodating cavity 121. It can be understood that the separator 13 may be set as a structure with a thick middle portion and a thin periphery, and a peripheral edge is fixed on an inner wall of the box assembly 11. When the gas pressure in the first accommodating cavity 121 is increased, a thicker portion in the middle of the separator 13 can expand towards the second accommodating cavity 122, so that the volume of the second accommodating cavity 122 is decreased gradually. When the pressure in the first accommodating cavity 121 is decreased, the thicker portion in the middle of the separator 13 can be gradually reset under the action of the rebounding element 14.

Figure 2:
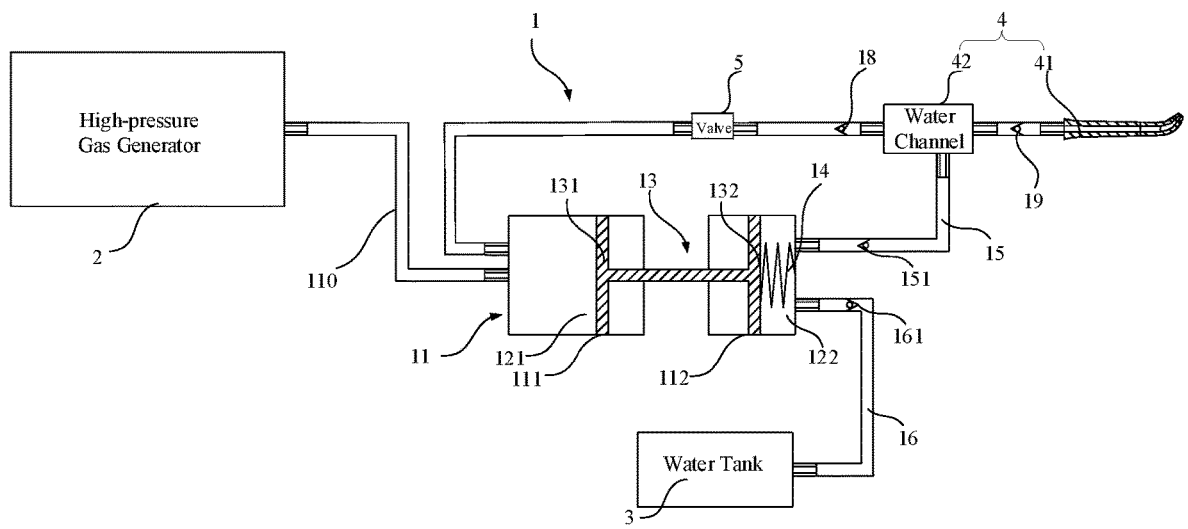
FIG. 2 is a schematic diagram illustrating a principle structure of a water toothpick according to a second embodiment.

As shown in FIG. 2, in a second embodiment, the box assembly 11 includes a first tank 111 and a second tank 112, and the separator 13 includes a first separator 131 and a second separator 132. The first separator 131 is movably arranged in the first tank 111 and is enclosed with the first tank 111 to form the first accommodating cavity 121. The second separator 132 is movably arranged in the second tank 112 and is enclosed with the second tank 112 to form the second accommodating cavity 122. The first separator 131 is connected with the second separator 132. In the embodiment, a piston may be used as the separator 13.

When the water toothpick in the embodiment is used, the high-pressure gas generator 2 firstly pumps gas into the first accommodating cavity 121 through the fourth connecting pipe 110, and the gas pressure in the first accommodating cavity 121 is gradually increased, thus driving the first separator 131 to move in the first accommodating cavity 121, and increasing the volume of the first accommodating cavity 121 gradually. Meanwhile, the second separator 132 moves in the same direction under driving of the first separator 131, namely the direction of decreasing the volume of the second accommodating cavity 122, which means that the separator 13 moves towards the direction of decreasing the volume of the second accommodating cavity 122 as a whole, thus increasing the pressure in the second accommodating cavity 122, and introducing the water in the second accommodating cavity 122 into the nozzle assembly 4 through the first one-way valve 151. After a certain amount of water is stored in the nozzle assembly 4, the valve 5 is opened, and the compressed gas in the first accommodating cavity 121 can be instantaneously discharged into the nozzle assembly 4, mixed with the water in the nozzle assembly 4 to form high-pressure vapor, and then sprayed out from the nozzle assembly 4 at a high speed. When the gas in the first accommodating cavity 121 is discharged, the pressure in the first accommodating cavity 121 can be decreased, the separator 13 is gradually reset under the action of the rebounding element 14, the negative pressure is formed in the second accommodating cavity 122, and the water in the water tank 3 can flow into the second accommodating cavity through the second one-way valve 161. In the embodiment, the principle of the water pump principle is also realized by only one high-pressure gas generator 2.

Particularly, in the embodiment, the first tank 111 is provided with a first vent, the first vent is arranged in a side wall of the first tank 111 opposite to the first accommodating cavity 121, the second tank 112 is provided with a second vent, and the second vent is arranged in a side wall of the second tank 112 opposite to the second accommodating cavity 122, so that sealing of the first accommodating cavity 121 and the second accommodating cavity 122 is not affected, and it can also be ensured that the first separator 131 can move better in the first tank 111 when the high-pressure gas generator 2 pumps the compressed air into the first accommodating cavity 121, and the second separator 132 can move better in the second tank 112 when the rebounding element 14 drives the separator 13 to reset.

In the third embodiment, the water supply 1 includes a water pump, and the water pump is respectively communicated with the water tank 3 and the nozzle assembly 4. In the embodiment, the first connecting pipe 15 is used for communicating the water tank 3 with the water pump, and the second connecting pipe 16 is used for communicating the water pump with the nozzle assembly 4. The third connecting pipe 17 is used for communicating the high-pressure gas generator with the valve 5.

When the water toothpick in the embodiment is used, the high-pressure gas generator 2 is firstly used to convey the compressed gas to the valve 5, and meanwhile, the water pump transmits the water in the water tank 3 to the nozzle assembly 4. When a certain amount of water exists in the nozzle assembly 4, the valve 5 is opened, and the compressed gas at the valve 5 is instantaneously discharged into the nozzle assembly 4, mixed with the water in the nozzle assembly 4 to form high-pressure vapor, and then sprayed out from the nozzle assembly 4 at a high speed. In the embodiment, the water pump and the high-pressure gas generator are used to realize the water-gas mixing effect, and a structure is simple.

The water toothpick further includes a power supply 6 and a circuit board 7, wherein the circuit board 7 is provided with a control circuit, and the high-pressure gas generator 2 and the valve 5 are both electrically connected with the circuit board 7.

The valve 5 is used for controlling the on and off of the compressed gas, and may be a regulating valve, a ball valve, a butterfly valve or a gate valve. Particularly, the valve may be set as a normally closed solenoid valve or an air motor valve.

Further, the water toothpick further includes a gas pressure sensor (not shown in the drawings), wherein the gas pressure sensor is electrically connected with the circuit board 7 and communicated with the high-pressure gas generator 2, and is used for detecting a gas pressure of the compressed gas generated by the high-pressure gas generator 2. The gas pressure sensor transmits a gas pressure signal to the circuit board 7, and when the gas pressure of the compressed gas generated by the high-pressure gas generator 2 reaches a first preset value, the circuit board 7 controls the high-pressure gas generator 2 to be closed and controls the valve 5 to be opened to discharge the compressed air into the nozzle assembly 4. When the gas pressure of the compressed gas generated by the high-pressure gas generator 2 reaches a second preset value, the circuit board 7 can control the valve 5 to be closed and control the high-pressure gas generator 2 to be opened, so that the high-pressure gas generator 2 can convey the compressed air to the valve 5 for next cleaning action. Particularly, the first preset value is higher than the second preset value, and the specific value is set according to a cleaning degree.

A third one-way valve 18 is arranged between the valve 5 and the nozzle assembly 4, and a blocking direction of the third one-way valve 18 is a direction flowing from the nozzle assembly 4 to the valve 5, thus preventing the water in the nozzle assembly 4 from flowing back to the valve 5, which affects a service life of the valve 5.

The nozzle assembly 4 includes a nozzle 41 and a water channel to be washed 42, wherein the water channel to be washed 42 is used for storing water and mixing the compressed air with water, and the water channel to be washed 42 is respectively communicated with the high-pressure gas generator 2 and the water supply 1. The nozzle 41 is communicated with the water channel to be washed 42, and the nozzle 41 is used for spraying out the high-pressure vapor formed by mixing the compressed air with the water. A fourth one-way valve 19 is arranged between the nozzle 41 and the water channel to be washed 42, and a blocking direction of the fourth one-way valve 19 is a direction flowing from the nozzle 41 to the water channel to be washed 42, thus preventing the water in the water channel to be washed 42 from flowing out along the nozzle 41 when the water toothpick is not operated.

Figure 3:
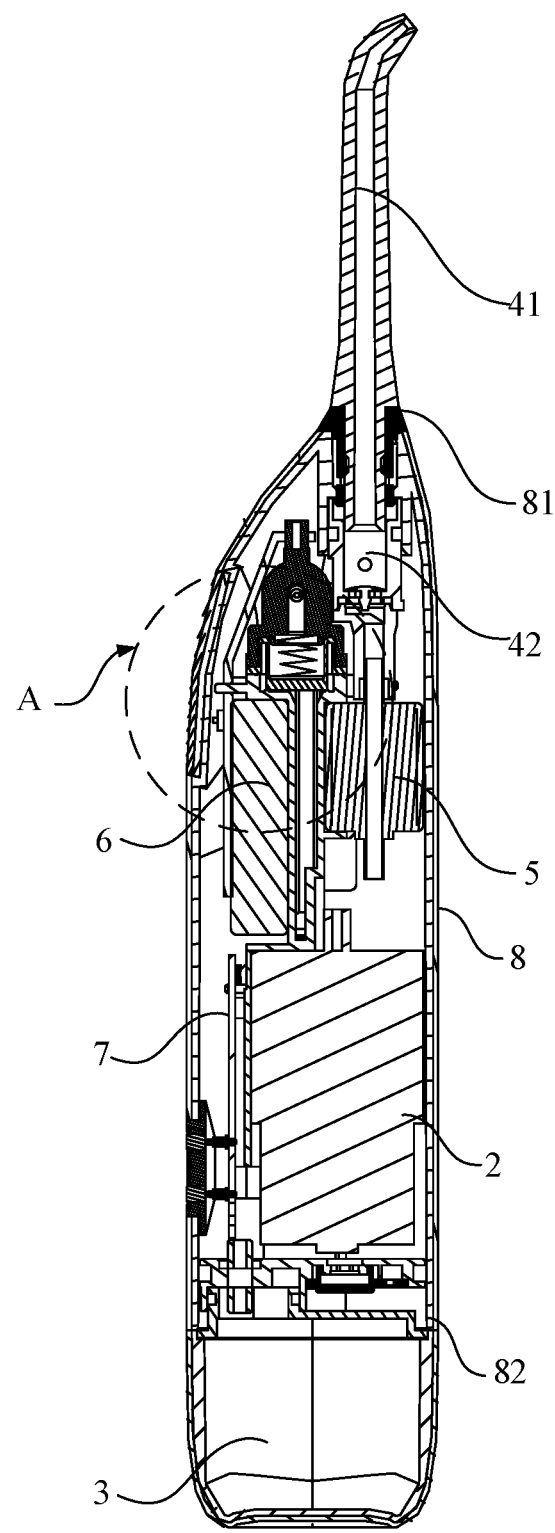
FIG. 3 is a schematic diagram illustrating an overall structure of the water toothpick.
Figure 4:
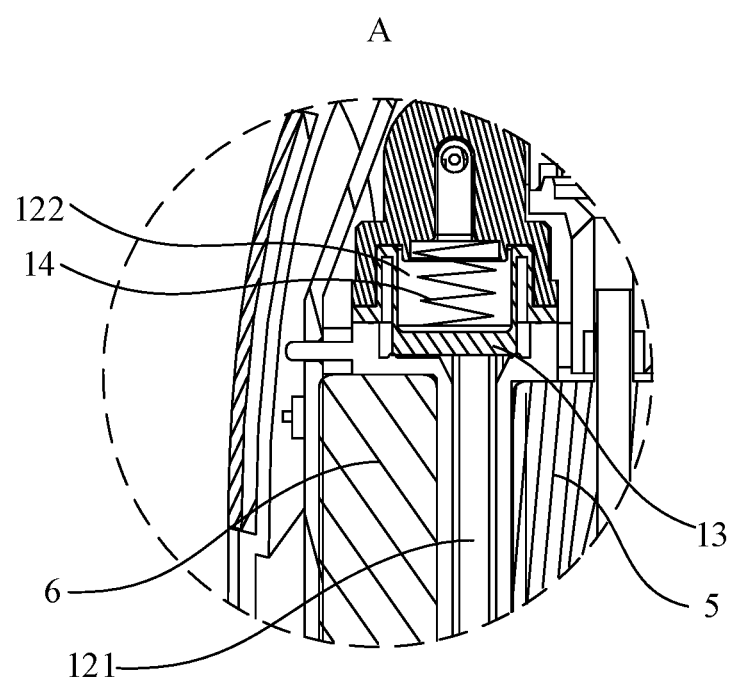
FIG. 4 is an enlarged diagram of a local position A.

As shown in FIG. 3 and FIG. 4, the water toothpick includes a shell 8, wherein the shell 8 is provided with a first end portion 81 and a second end portion 82 which are oppositely arranged, the water supply 1, the high-pressure gas generator 2, the water tank 3, the valve 5, the power supply 6 and the circuit board 7 are all located in the shell 8, and the nozzle assembly 4 is arranged close to the first end portion 81. The nozzle 41 is connected with the first end portion 81, and the water channel to be washed 42 is arranged close to the first end portion 81, so that the nozzle 41 can be directly communicated with the water channel to be washed 42 without occupying a larger space in the shell 8. The water tank 3 is connected with the second end portion 82, and when the amount of water stored in the water tank 3 is used up, the water tank 3 can be directly removed and water can be added into the water tank 3. The water supply 1, the high-pressure gas generator 2, the power supply 6 and the circuit board 7 are all arranged between the water tank 3 and the water channel to be washed 42, so that all components of the water toothpick are arranged compactly, and the water toothpick is ensured to be small in volume and convenient to carry.

In the embodiment, the first connecting pipe 15, the second connecting pipe 16, the third connecting pipe 17 and the fourth connecting pipe 110 are all flexible pipes, the flexible pipe occupies a small volume and has a good flexibility, a position between two components communicated through the flexible pipe can be flexibly arranged in the shell 8, and a circulating effect of gas and water cannot be affected, so that a structure of the water toothpick is more compact while a use effect of the water toothpick can be ensured. It can be understood that the first connecting pipe 15, the second connecting pipe 16, the third connecting pipe 17, and the fourth connecting pipe 110 may also be set as hard connecting pipes.

In conclusion, water and gas can be mixed to form the high-pressure vapor in the water toothpick of the present invention, the cleaning mode of the high-pressure vapor has a better cleaning effect compared with the cleaning mode of pure high-pressure water flow, and water can be saved at the same time.

The above merely describes the embodiments of the present invention, but is not intended to limit the patent scope of the present invention. Any equivalent transformation made according to the contents of the description and the drawings of the present invention, or direct or indirect application of the contents of the description and the drawings of the present invention in relevant technical fields, shall be likewise included in the scope of protection of the present invention.

The invention claimed is:

1. A water toothpick, comprising a high-pressure gas generator, a water toothpick valve, a water supply, a water tank and a nozzle assembly, wherein the high-pressure gas generator is communicated with the nozzle assembly, the water toothpick valve is arranged between the high-pressure gas generator and the nozzle assembly, and the water supply is respectively communicated with the water tank and the nozzle assembly, so as to convey water in the water tank to the nozzle assembly, wherein the water supply comprises a box assembly, a separator, a rebounding element, a first one-way valve and a second one-way valve, the box assembly is provided with an accommodating cavity, and the separator is movably arranged in the accommodating cavity to divide the accommodating cavity into a first accommodating cavity and a second accommodating cavity; the first accommodating cavity is respectively communicated with the high-pressure gas generator and the nozzle assembly, and the water toothpick valve is arranged between the first accommodating cavity and the nozzle assembly; the second accommodating cavity is respectively communicated with the water tank and the nozzle assembly, the first one-way valve is arranged between the nozzle assembly and the second accommodating cavity, a blocking direction of the first one-way valve is a direction flowing from the nozzle assembly to the second accommodating cavity, the second one-way valve is arranged between the water tank and the second accommodating cavity, and a blocking direction of the second one-way valve is a direction flowing from the second accommodating cavity to the water tank; and two ends of the rebounding element are connected to the separator and the box assembly.

2. The water toothpick according to claim 1, wherein the water supply comprises a water pump, and the water pump is respectively communicated with the water tank and the nozzle assembly.

3. The water toothpick according to claim 1, comprising a circuit board and a power supply, wherein the circuit board is provided with a control circuit, the circuit board is electrically connected with the power supply, and the high-pressure gas generator is electrically connected with the circuit board.

4. The water toothpick according to claim 3, wherein the water toothpick valve is electrically connected with the circuit board.

5. The water toothpick according to claim 3, further comprising a gas pressure sensor, wherein the gas pressure sensor is communicated with the high-pressure gas generator, and is electrically connected with the circuit board.

6. The water toothpick according to claim 1, wherein the water toothpick valve is a regulating valve, a ball valve, a butterfly valve or a gate valve.

7. The water toothpick according to claim 1, wherein a third one-way valve is arranged between the water toothpick valve and the nozzle assembly, and a blocking direction of the third one-way valve is a direction flowing from the nozzle assembly to the water toothpick valve.

8. The water toothpick according to claim 1, wherein the nozzle assembly comprises a water channel to be washed and a nozzle, the nozzle is communicated with the water channel to be washed, and the water channel to be washed is respectively communicated with the high-pressure gas generator and the water supply.

9. The water toothpick according to claim 8, wherein a fourth one-way valve is arranged between the water channel to be washed and the nozzle, and a blocking direction of the fourth one-way valve is a direction flowing from the nozzle to the water channel to be washed.

10. The water toothpick according to claim 1, further comprising a shell, wherein the shell is provided with a first end portion and a second end portion which are oppositely arranged, the high-pressure gas generator, the water supply and the water toothpick valve are all located in the shell, the nozzle assembly is arranged close to the first end portion, and the water tank is connected with the second end portion.

* * * * *